United States Patent [19]

Scott

[11] Patent Number: 5,313,533
[45] Date of Patent: May 17, 1994

[54] SYSTEM AND METHOD FOR BIDIRECTIONAL ADAPTIVE THRESHOLDING

[75] Inventor: Kevin C. Scott, Rochester, N.Y.

[73] Assignee: Eastman Kodak Company, Rochester, N.Y.

[21] Appl. No.: 125,081

[22] Filed: Sep. 21, 1993

Related U.S. Application Data

[63] Continuation of Ser. No. 797,630, Jan. 25, 1991, abandoned.

[51] Int. Cl.[5] .............................................. G06K 9/38
[52] U.S. Cl. ........................................ 382/50; 382/53; 382/62; 358/465; 358/466
[58] Field of Search ................ 382/50, 53, 58, 62, 382/9; 358/465, 466; G06K 1/38, 7/00, 9/20, 9/00, 9/34; H04N 1/40, 1/417

[56] References Cited

U.S. PATENT DOCUMENTS

| | | | |
|---|---|---|---|
| 4,468,704 | 8/1984 | Stoffel et al. | 358/282 |
| 4,811,412 | 3/1989 | Katsurada | 382/9 |
| 4,853,795 | 8/1989 | Morton et al. | 358/447 |
| 4,903,145 | 2/1990 | Funada | 358/462 |
| 4,908,875 | 3/1990 | Assael et al. | 358/52 |
| 4,982,294 | 1/1991 | Morton et al. | 358/465 |
| 5,086,486 | 2/1992 | Yamada | 382/53 |

FOREIGN PATENT DOCUMENTS

| | | | |
|---|---|---|---|
| 0333313 | 2/1989 | European Pat. Off. | H04N 1/40 |
| 2135852 | 2/1984 | United Kingdom | H04N 1/40 |

Primary Examiner—Yon J. Couso
Attorney, Agent, or Firm—Thomas H. Close

[57] ABSTRACT

A bidirectional adaptive thresholding technique for use in an image processing system. An array of pixel sensors scans a grayscale image and generates a set of grayscale image data. A buffer storage connected to the sensors stores the grayscale image data. A forward tracker reads the image data from the buffer storage in a forward direction and provides background and peak forward tracked values. A reverse tracker reads the image data in a reverse direction and provides background and peak reverse tracked values. A threshold level generating circuit generates a threshold level that is a proportional function of either the forward or reverse tracked values based on validity criteria. Thereafter, a thresholding circuit thresholds the grayscale image data using the threshold level to provide binary image data.

28 Claims, 6 Drawing Sheets

SYSTEM AND METHOD FOR BIDIRECTIONAL ADAPTIVE THRESHOLDING

This is a continuation of application Ser. No. 07/797,630, filed Nov. 25, 1991 now abandoned.

TECHNICAL FIELD OF THE INVENTION

The present invention relates to the field of image processing and, more particularly, to systems and methods of thresholding a grayscale image to obtain a bitonal output.

BACKGROUND ART

In performing digital processing of a grayscale image, a variety of thresholding techniques has been employed in the art. For example, in fixed thresholding, the magnitude of an analog output signal from a pixel sensor is compared against a fixed threshold value. Output signal levels above the fixed threshold level are digitized to one digital value, e.g. a binary one representing black, while levels equal to or below the fixed threshold level are digitized to another digital value, e.g. a binary zero representing white.

Other, more complex, thresholding techniques have also been used in the past. U.S. Pat. No. 4,908,875 (issued to D. Assael et al on Mar. 13, 1990 and hereinafter referred to as the '875 patent) describes an adaptive thresholding technique that is designed to vary the threshold value during image processing in order to compensate for the detrimental effects of a variety of noise sources. An adaptive thresholding technique is used here inasmuch as the magnitude of noise signals usually varies from one sensor to the next and at different locations along a scan line. Specifically, as described therein, an adaptive threshold level is set for each pixel position as a function of a running average of an analog sensor signal to which an offset value is added. The offset value is a function of a global measure of the noise as well as a function of the noise generated by the sensors.

U.S. Pat. No. 4,468,704 (issued to J. Stoffel et al on Aug. 28, 1984 and hereinafter referred to as the '704 patent) describes another adaptive thresholding technique that employs a threshold level which is updated continuously on a pixel-by-pixel basis in accordance with changes in image content. This technique uses a fractional average content algorithm in which a threshold level is set in accordance with an adaptive offset value that is a function of white peak and black valley pixel signals. After each pixel is processed, the white peak pixel signal is updated at each black-to-white transition and in each white region. The black valley pixel signal is updated at each white-to-black transition and in each black region. As such, the offset value and therefore the threshold level are updated in accordance with an algorithm based on the updating of the white peak and black valley pixel signals. The thresholding technique of the '704 patent also reduces the effects of noise.

Although such prior-art thresholding techniques have served their purposes, they have not proved entirely satisfactory under all conditions of service for the reason that considerable difficulty has been experienced in processing those areas of the image that are located adjacent to image edges. Most prior-art techniques require substantial settling times at the start of a data scan before valid data becomes available for adaptive thresholding. In this regard, at the very start of each scan line, adaptive threshold values are usually "seeking" a proper signal level and are therefore not usable. Consequently, those concerned with the development of image processing systems and methods have long recognized the need for providing thresholding techniques that mitigate, inter alia, settling-time problems associated with not having valid data. The present invention fulfills this need.

DISCLOSURE OF THE INVENTION

I have advantageously developed a bidirectional adaptive thresholding technique that overcomes the deficiencies known in the art.

Through my invention, I provide image processing systems and methods in which adaptive thresholding is performed by tracking background and peak pixel values with a selective "slow approach" or "fast approach" based on comparisons of the input pixel data and current tracked values. A threshold is then calculated as a proportional value (e.g. an average) of the current background and peak values. The input line of grayscale image data is held in a buffer, and background and peak tracking algorithms are run both in a left-to-right (forward) direction and a right-to-left (reverse) direction. Having separate forward and reverse passes solves the so-called "settling-time" and "have-not-yet-seen-valid-data" problems by insuring that all important points in the image line have usable data.

BRIEF DESCRIPTION OF THE DRAWINGS

The teachings of my invention will be readily understood by considering the following detailed description in conjunction with the accompanying drawings, in which.

To facilitate understanding, identical reference numerals have been used, where possible, to denote identical elements that are common to various figures.

MODES OF CARRYING OUT THE INVENTION

Figure 1:
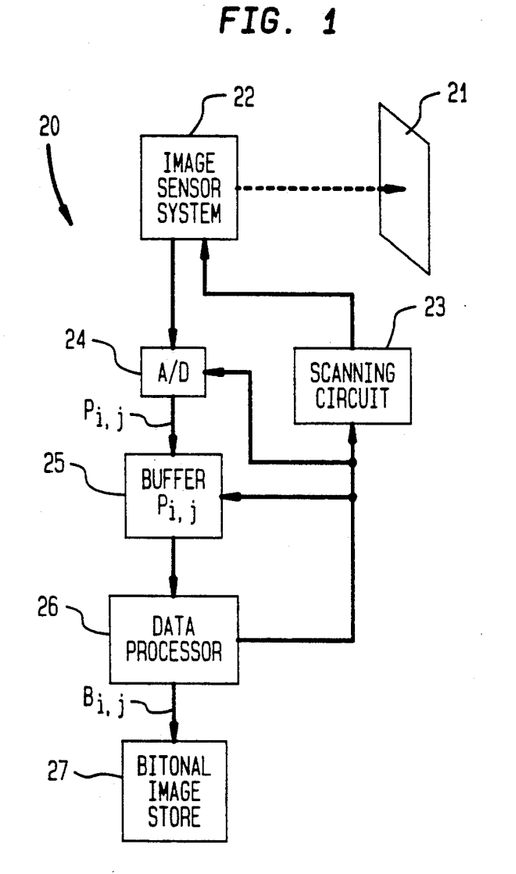
FIG. 1 is an overall block diagram of the preferred embodiment of my invention.

Referring now to the drawings, FIG. 1 shows image processing system 20 for converting a grayscale image contained on medium 21 into a bitonal image. Processing system 20 includes image sensor system 22. Under the control of scanning circuit 23, image sensor system 22 optically reads the grayscale image from medium 21. Sensor system 22 outputs a series of analog grayscale values that are quantized by analog-to-digital (A/D) converter 24 to produce grayscale image data as a series of multi-level sensor pixels $P_{i,j}$ that are written into storage buffer 25. The indices i,j represent two-dimensional positions on medium 21 that correspond to the relative image locations of the sensor pixels $P_{i,j}$. The contents of buffer 25 are processed into bitonal pixels $B_{i,j}$ by data processor 26. The bitonal pixels $B_{i,j}$ together constitute a bitonal image of the original grayscale image appearing on medium 21. The bitonal pixels $B_{i,j}$ are stored in bitonal (binary) image store 27.

Figure 2:
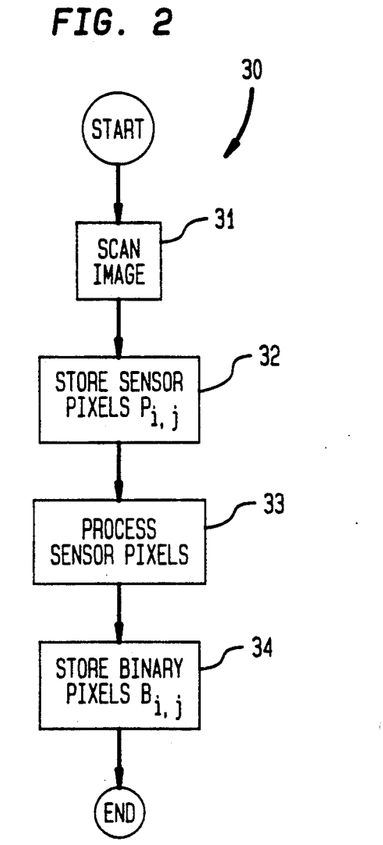
FIG. 2 is a flow diagram illustrating the operation of the preferred embodiment shown in FIG. 1.

The flow diagram in FIG. 2 illustrates the operation of processing system 20 shown in FIG. 1. In step 31, data processor 26 provides timing signals to scanning circuit 23 thereby causing image sensor system 22 to scan the image on medium 21. As the image is scanned, the resulting sensor pixels $P_{i,j}$ are stored, through step 32, in buffer 25 via A/D converter 24. Data processor 26 will then perform pixel processing 33 of the stored multi-level sensor pixels $P_{i,j}$ to generate the bitonal pixels $B_{i,j}$ that are stored, via step 34, in image store 27.

Pixel processing step 33 will be described in detail in the context of reading digital data stored on film, a technology that is currently of great interest in the data processing field. It is to be understood, however, that the principles of the present invention are readily applicable to most general-purpose thresholding systems and methods. In this regard, the present invention may be illustratively used to produce a bitonal image from a highly irregularly shaped original, as well as from a highly structured original such as printed text, a bar code, or digital data as depicted in FIG. 3.

Figure 3:
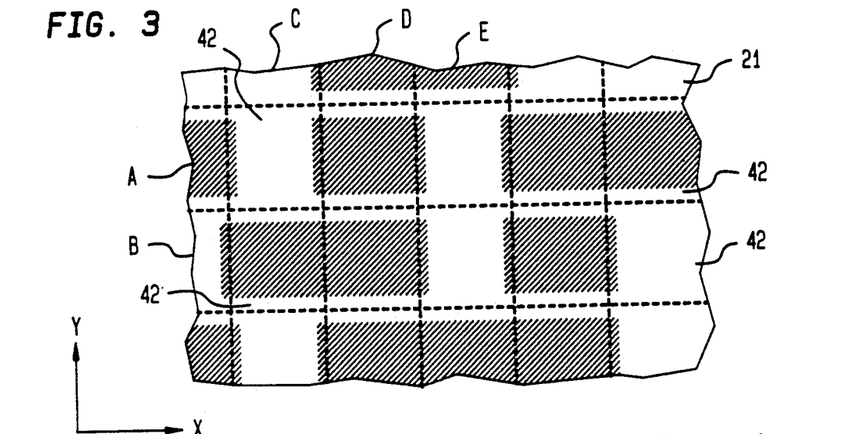
FIG. 3 is a plan view of image medium 21.
Figure 4:
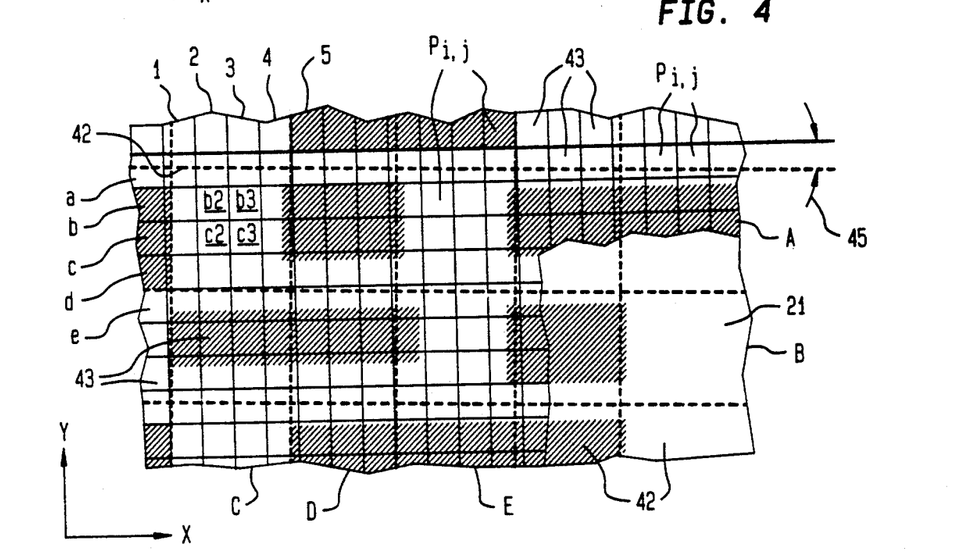
FIG. 4 is a plan view of a portion of the embodiment of FIG. 1 superimposed on medium 21 shown in FIG. 3.
Figure 5:
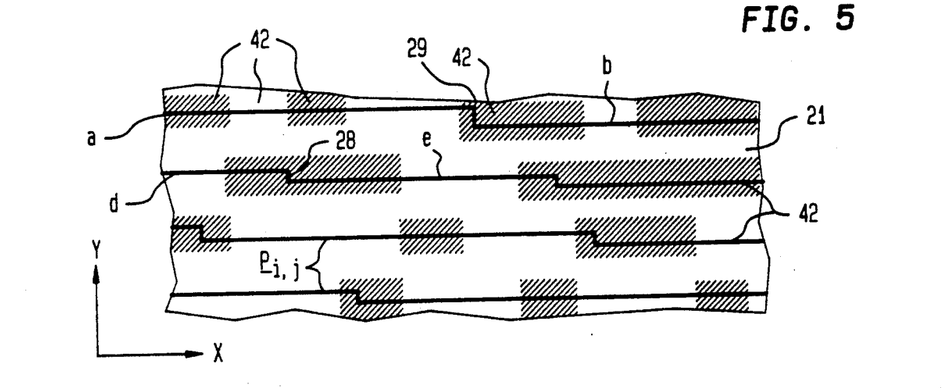
FIG. 5 is a plan view, similar to the view shown in FIG. 3, of image medium 21.

With particular reference to FIGS. 3-5, digital data is illustrated as being written in so-called data "cells" 42, on film 21, as rows of black and white areas. In FIGS. 3 and 4, data cells 42 are outlined with dashed lines to form rows and columns, some of which are identified as rows (A) and (B), and as columns (C), (D) and (E). Cells 42 in row (A) and columns (C) and (E), for example, contain white areas which may represent a digital one. Cells 42 in row (B) and columns (C) and (D) contain black areas (indicated by cross-hatching) which may represent a digital zero. Originally, the black areas are typically generated, i.e. binary ones are written on film 21, by exposing the film to light at the desired cell locations. The white areas are typically generated, i.e. binary zeros are written on film 21, by not exposing the appropriate locations of the film to light.

The data reading process, depicted schematically in FIG. 4, involves optically scanning film 21 with sensor system 22 (see FIG. 1). This system is composed of an array of pixel sensors that are arranged in rows and columns, some of which are identified as rows (a)-(e) and columns (1)-(5). In FIG. 4, the areas 43 scanned by respective individual pixel sensors are shown as superimposed on film 21. The pixel sensors, which may each comprise a charge-coupled device (CCD), scan film 21 by sensing the amount of light emitted from their associated pixel positions i,j, where i=a, b, c, d, e, ... (rows), and j=1, 2, 3, 4, 5, ... (columns). The array of sensors are dimensioned such that oversampling of data cells 42 occurs, i.e. the pixel pitch of scanner array 21 is at least three times the pitch of data cells 42, both in the X and Y directions. Oversampling in this fashion insures that there are always at least two sensor pixels $P_{i,j}$ per film data cell 42 in each axis direction X, Y which do not extend beyond the boundary of each of the data cells.

Figure 6:
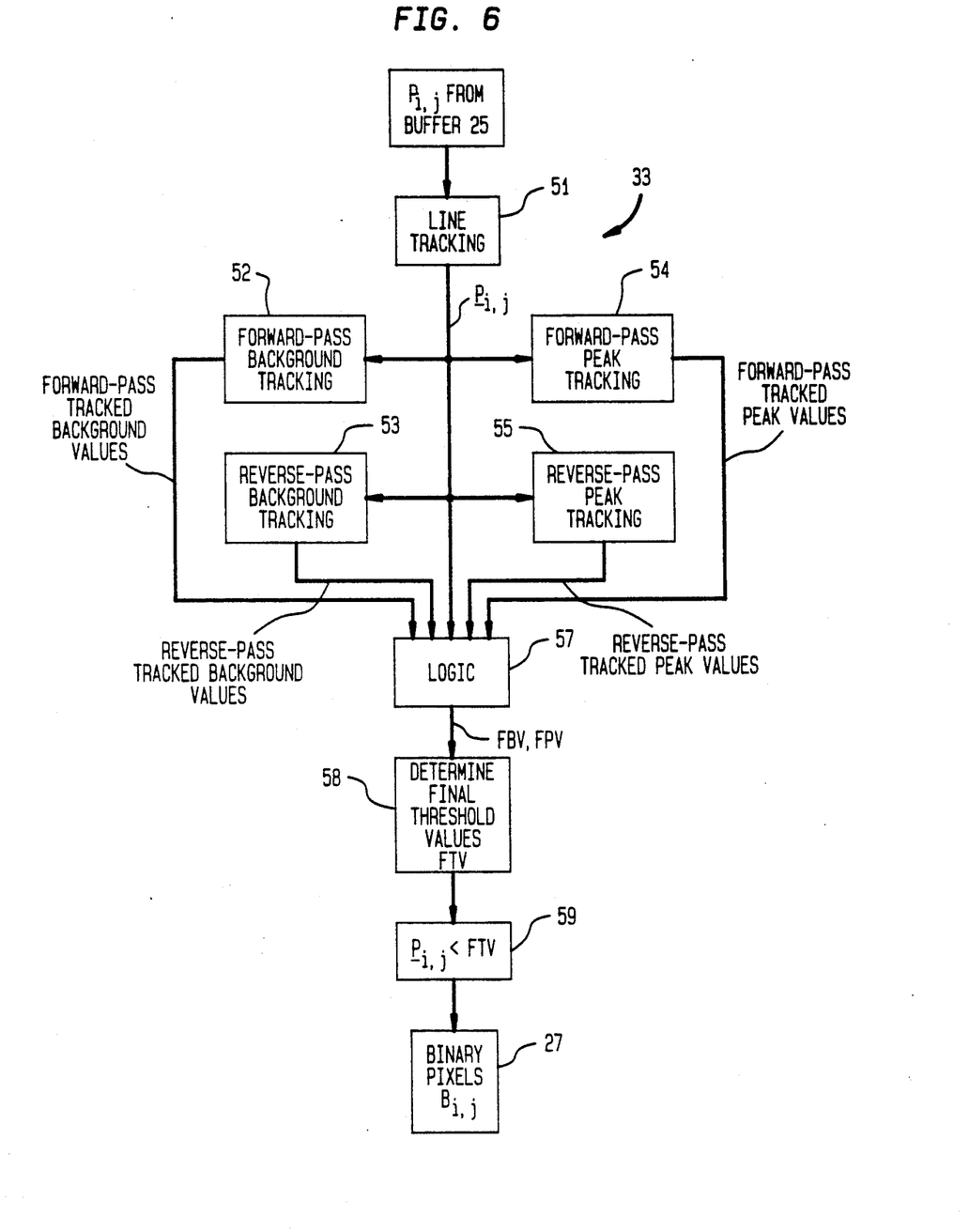
FIG. 6 is a flow diagram showing in greater detail a portion of the process depicted in the flow diagram shown in FIG. 2.

Referring now to FIG. 6, pixel processing step 33 begins with line tracking step 51. This latter step, when performed, insures that those pixels $P_{i,j}$ that are closest to the center of data cells 42 are used to generate the corresponding bitonal pixels $B_{i,j}$. The line of pixels $P_{i,j}$ that is tracked in line tracking step 51 will be referred to as the data line pixels $\underline{P}_{i,j}$. Line tracking step 51 is illustrated schematically in FIG. 5. Line tracking step 51 effectively "de-skews" the images on film 21 with respect to the alignment of the array of pixel sensors which may be skewed at some arbitrary angle 45 (see FIG. 4). Line tracking step 51, shown in FIG. 5, will not be necessary in all situations. Line tracking will normally be required when, as in the present case, data cells 42 are arranged, as shown, in narrow, closely spaced rows. Printed text is another example of an image that would probably require some type of de-skewing such as performed by line tracking step 51. However, line tracking step 51 will usually not be necessary when processing an unformatted image or when the vertical profile of a formatted image is relatively large (e.g. a bar code).

As seen in FIG. 5, line tracking step 51 involves the process of selecting the data line pixels $\underline{P}_{i,j}$ that lie on a line that passes closest to the center of cells 42. For example, in the top row of data cells 42 shown in FIG. 5, sensor pixels $P_{i,j}$ are initially tracked in row (a), i.e. which form pixels $P_{a,j}$. Then, at point 29, pixel tracking is shifted to row (b), i.e. to the next lower row of pixels, i.e. pixels $P_{b,j}$. Pixels $P_{d,j}$ from row (d) are first selected for the next row of data cells 42 followed by a shift to row (e) (i.e. pixels $P_{e,j}$) being made at point 28. Data processor 26 selects the appropriate row of pixels by comparing the relative distribution of the black and white areas in the vertical direction and by tracking those pixels $P_{i,j}$ that fall on the continuous white horizontal space that vertically separates data cells 42.

Using the data line pixels $\underline{P}_{i,j}$ selected during line tracking procedure 51 shown in FIG. 6, data processor 26 (see FIG. 1) will perform, as shown in FIG. 6, forward-pass background tracking procedure 52, reverse-pass background tracking procedure 53, forward-pass peak tracking procedure 54, and reverse-pass peak tracking procedure 55. These background and peak tracking procedures are graphically illustrated in FIGS. 7 and 8. In general, background and peak tracking involves tracking background and peak values of the pixels $\underline{P}_{i,j}$ and generating a set of tracked peak values represented by lines 61 and 71, and corresponding tracked background values represented by corresponding lines 62 and 72 by a selective "slow approach" or "fast approach" based on comparisons of the input data, i.e. the data line pixels $\underline{P}_{i,j}$, and the current tracked values (as represented by lines 61, 62, 71 and 72). Forward threshold values 63 and reverse threshold values 73 are then calculated as a proportional value (e.g. an average) of the current tracked background and peak values (lines 61 and 62, and 71 and 72, respectively).

Figure 7:
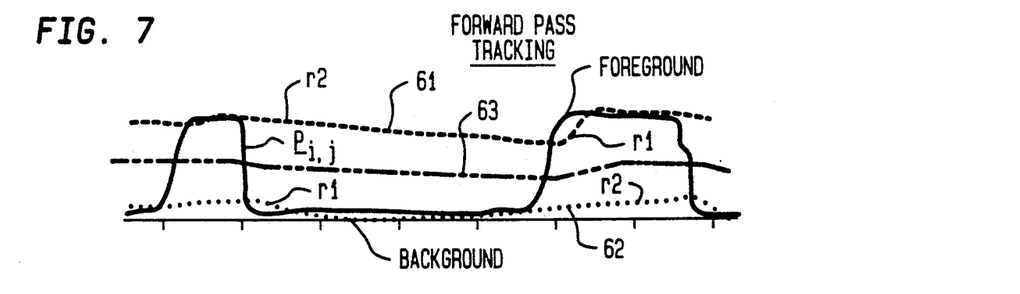
FIGS. 7–11 are graphs that are useful in understanding the process illustrated in FIGS. 6 and 12.

More specifically, forward-pass background tracking procedure 52 is illustrated in FIG. 7. Through this procedure, the pixels $\underline{P}_{i,j}$ are processed (tracked) in the left-to-right (forward) direction. The desired result is to approximate the recent minimum values encountered in a stream of grayscale image data, i.e. the pixels $\underline{P}_{i,j}$. The corresponding forward tracked background values, represented by line 62, are then determined and maintained. For each input pixel $\underline{P}_{i,j}$, a comparison is then made with the current forward tracked background value on line 62. If the magnitude of the current pixel $\underline{P}_{i,j}$ is lower than the current tracked value, then the next tracked background value is reduced. If the magnitude of an input pixel $\underline{P}_{i,j}$ is higher than the current tracked value, then the next tracked value is increased. The rates r1 and r2 of decrease and increase, respectively, are different and are chosen so that the tracked values, represented by line 62, will quickly meet the values of the input pixels $\underline{P}_{i,j}$ in the downward direction, and will slowly move toward the input pixels $\underline{P}_{i,j}$ in the upward direction.

In forward-pass peak tracking procedure 54 also illustrated in FIG. 7, the desired result is to approximate the recent maximum values encountered in a stream of grayscale image data, i.e. pixels $\underline{P}_{i,j}$. The forward tracked peak value, represented by line 61, is maintained. For each input pixel $\underline{P}_{i,j}$, a comparison is made with the current tracked peak value. If the magnitude of the pixel $\underline{P}_{i,j}$ is higher than the current tracked value, the tracked value is increased. If the magnitude of the input pixel $\underline{P}_{i,j}$ is lower than the current tracked peak value, the tracked value is reduced. The rates of decrease, r2, and increase, r1, are different and are chosen here so that the tracked values, represented by line 61, will quickly meet the input values of pixels $\underline{P}_{i,j}$ in the upward direction, and will move slowly in the downward direction.

To determine the best "slow approach" rate, i.e. rate r2, it is necessary to know a priori the largest distance between background-peak transitions that must be handled correctly by the tracking process. In large areas of background, the tracked peak levels, represented by line 61, will degrade, and in large areas of foreground, the tracked background levels, represented by line 62, will also degrade. A slow approach is chosen so that this degradation is acceptably small compared with the expected minimum contrast level that may be experienced. It is noted that the contrast is related to the magnitude of the background-peak transitions. For stored digital data on film, the maximum data line distance between transitions is easy to determine since the encoding format guarantees that this distance will usually be within fixed limits.

The "fast approach" rate, i.e. rate r1, is based on the "slow approach" rate, i.e. rate r2, and the expected worst-case duty cycle of the image data. For example, an input image containing maximum-length runs of background alternating with minimum-length runs of foreground would have the worst-case duty cycle for peak tracking. It must be insured that, during the minimum-length foreground run, the peak tracking process adjusts sufficiently quickly to compensate for degradation experienced during the previous maximum-length background run. Again, this type of operation is easy to provide for use with digital data on film since the predetermined encoding format normally keeps the duty cycle within fixed limits.

One current format used in storing digital data on film specifies a maximum-length run of 13 pixels, a maximum-length run of three pixels, and a minimum expected contrast of 50 counts (out of 256 levels of black, white and gray). Consequently, for the "slow approach" rate, i.e. rate r2, a preferred fixed rate of change is 0.64 counts per pixel, (i.e. 50/(6 * 13)), which will limit the degradation on a maximum-length run to one-sixth of the minimum expected contrast. For the "fast approach" rate, i.e. rate r1, the preferred decay is exponential and given by equation (1) as follows:

$$NTV = OTV + (\underline{P}_{i,j} - OTV)/6 \quad (1)$$

where:

NTV is the new tracked value and OTV is the old tracked value.

This combination limits the overall degradation of the tracked peak values or the tracked background values to 20 counts.

It is noted that the above tracking operations are described as being applied to individual lines of data obtained from spaced rows of data line pixels $\underline{P}_{i,j}$ rather than the entire image. As mentioned previously, the input consists of a stream of pixels $\underline{P}_{i,j}$ selected along the center of each row of data written on the film. This allows the process to be implemented one-dimensionally. Of course, those skilled in these arts will recognize other applications of this invention where processing of the entire image is performed and all pixels $P_{i,j}$ in the entire two-dimensional image are used as input data.

Figure 8:
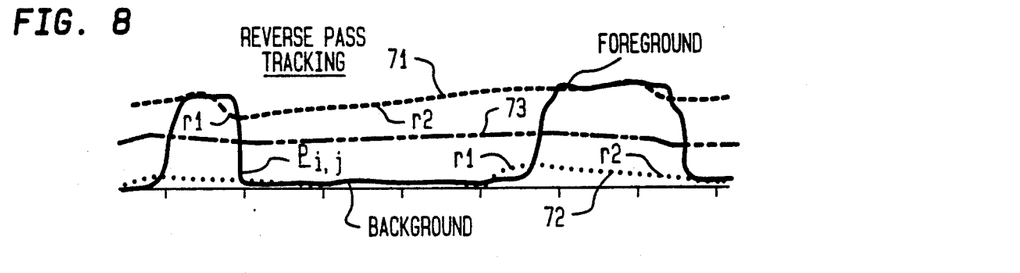

FIG. 8 illustrates the results obtained in performing reverse-pass tracking procedures 53 and 55. In FIG. 8, the pixels $\underline{P}_{i,j}$ of a given row are processed (tracked) in the right-to-left (reverse) direction. The reverse tracked background values, represented by line 72, are obtained through reverse-pass background tracking procedure 53. The reverse tracked peak values, represented by line 71, are obtained through reverse-pass peak tracking procedure 55. The processing performed in reverse-pass background tracking and forward-pass background tracking procedures 53 and 52 respectively, are the same except that the data line pixels $\underline{P}_{i,j}$ is processed in opposite directions. Likewise, the processing performed in reverse-pass peak tracking and forward-pass peak tracking procedures 55 and 54, are the same except that here, too, the pixels $\underline{P}_{i,j}$ are processed in opposite directions. Having separate forward and reverse passes solves two important problems mentioned above, viz. the so-called "settling-time" problem and the so-called "have-not-yet-seen-valid-data" problem.

Figure 9:
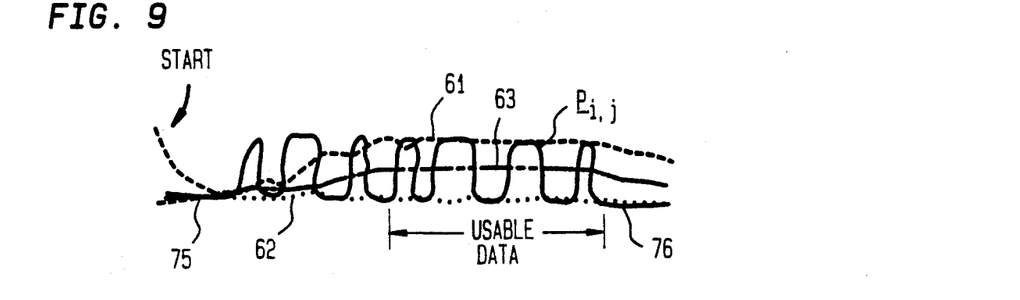
Figure 10:
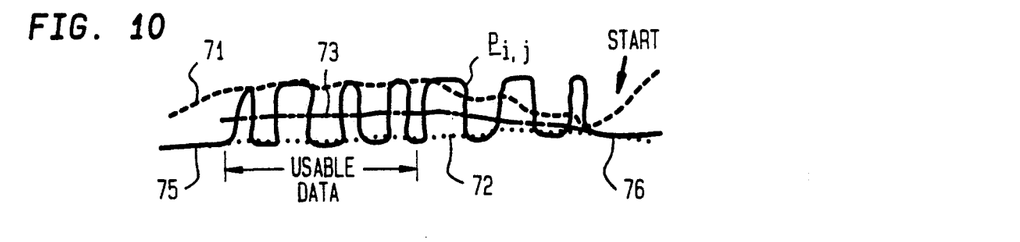
Figure 11:
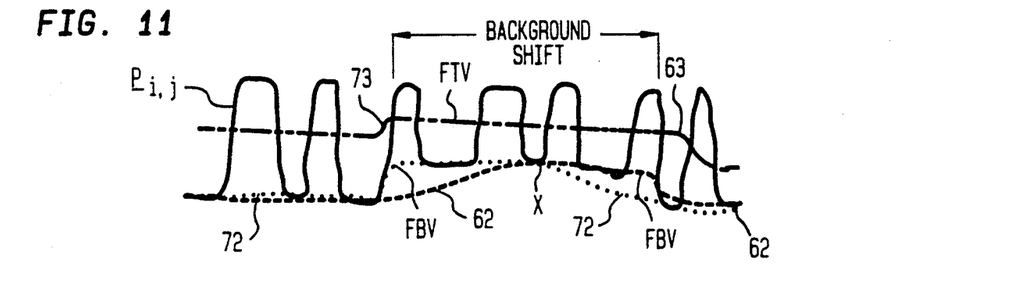

When performing tracking procedures 52-55, settling times are required at the start of each data sequence. These features are illustrated in FIGS. 9–11. At the very start of each line, the tracked background values, represented by lines 62 and 72 and the tracked peak values, represented by lines 61 and 71, are seeking appropriate signal levels and are therefore not usable. In left margin area 75 of the image (see FIG. 9), the forward-pass procedures (shown in FIG. 9) have not yet been exposed to any non-background data, so the tracked peak values, represented by line 61, and threshold values, represented by line 63, are not valid and, therefore, still not usable. In right margin area 76 of the image, the reverse-pass procedures (shown in FIG. 10) have not yet been exposed to any non-background data, so the tracked peak values, represented by line 71, and threshold values, represented by line 73, are not valid and, therefore, still not usable. There is some additional settling time required at the beginning of the written area of the image while the peak tracking procedures adjust themselves. Also, in many cases, tracking procedures 52-55 cannot respond sufficiently quickly to sudden shifts in the input background or peak levels. A background shift, illustrated in FIG. 11, may occur due to smudges and dirt on medium 21, which appear as localized areas with an increased background level.

To overcome these problems, the input data line pixels $\underline{P}_{i,j}$ are held in the buffer 25 (see FIG. 4), and background and peak tracking procedures 52-55 (see FIG. 6) are run both in a left-to-right (forward) direction and a right-to-left (reverse) direction. In this way, at least one of the background or peak tracking passes has usable values for all important points in the image line. Typically, the forward-pass values, represented by lines 61 and 62 in FIG. 9, are not usable in left margin 75 but are acceptable in right margin 76 (or most of it). Likewise, the reverse-pass values, represented by lines 71 and 72, in FIG. 10, are not usable in right margin 76 but are acceptable in left margin 75 (or most of it).

Thereafter, pixel processing step 33, shown in FIG. 6, determines in logic step 57 those portions of the image line that may use the forward-pass values, and those portions of the image line that may use the reverse-pass value. In determining the final threshold values, a logic decision is made for each pixel location (i,j) in the data line to select either the forward-pass data values, represented by lines 61 and 62, or the reverse-pass values, represented by lines 71 and 72.

As indicated in FIGS. 9 and 10, in most portions of the data line, both the forward-pass and reverse-pass tracked values, represented by lines 61 and 62, 71 and 72, are usable. For most pixel locations (i,j), the final background value, FBV, and final peak value, FPV, will be determined in logic step 57 as follows:

FBV = maximum of corresponding forward-pass and reverse-pass tracked background values FPV = minimum of corresponding forward-pass and reverse-pass peak values However, in order to determine the FBV and FPV, logic step 57 must first determine the following:
whether the forward-pass background value is usable,
whether the forward-pass peak value is usable,
whether the reverse-pass background value is usable, and
whether the reverse-pass peak value 71 is usable.

These determinations are made by logic step 57 through use of contrast criteria and by locating crossing points. In evaluating contrast, a predetermined maximum peak-to-background contrast value, max(P-B), is used by logic step 57. The contrast value max(P-B), which has been previously supplied to data processor 26 (see FIG. 1) prior to image processing, is primarily selected by the user as a function of the composition and format of the image to be processed and medium 21.

Thereafter, during logic step 57 shown in FIG. 6, for each pixel $P_{i,j}$, the peak-to-background value (P-B) is compared to the product of the maximum contrast value max(P-B) and a predetermined fractional constant Q as follows:

$$(P\text{-}B) < (Q * max(P\text{-}B))?$$

Constant Q, typically ¼, allows for reasonable variations in contrast within the data line. If the comparison is true, i.e. the local peak-to-background value (P-B) is less than (Q * max(P-B)), then the data is considered to be of low contrast and unusable. Alternatively, if the comparison is false, then the data is considered to have sufficient contrast and, therefore, usable based on contrast criteria.

Additionally, crossing points, such as point X shown in FIG. 11, are located during logic step 57 shown in FIG. 6. These crossing points are of concern only if the data at each such point in question is considered to be usable based on the contrast criteria. To locate the crossing points, logic step 57 performs a magnitude comparison at each pixel location (i,j) between the forward-pass and reverse-pass values. When the difference between the background values, represented by lines 62 and 72, changes sign for successive pixels, then a background crossing point (e.g. point X shown in FIG. 11) is located. When the difference between the peak values, represented by lines 61 and 71, changes sign for successive pixels, then a peak crossing point is located. At the background crossing points, the forward and reverse background values, represented by lines 62 and 72, are both considered usable. At the peak crossing points, the forward and reverse peak values, represented by lines 61 and 71, are both considered usable. Crossing point data and all subsequent data are considered usable until such time that a point is encountered that is considered to be unusable based on contrast criteria.

To select the final background value, FBV, at each pixel location (i,j), logic step 57 performs the following logic:
If both the forward and reverse background tracking values are usable, pick the maximum of the two values.
If only one such value is usable, pick that value.
If neither of these values is usable, pick the minimum of these two values (since one of these two values could be in the initial settling phase and hence much too high).

To select the final peak value, FPV, at each pixel location (i,j) logic step 57 performs the following logic:
If both the forward and reverse peak tracking values are usable, pick the minimum of the two values.
If only one such value is usable, pick that value.
If neither of these two values is usable, estimate a final peak value, FPV, as FBV + (Q * max(P-B)).

Consequently, based on the above logic rules, the final background value, FBV, for the background shift situation of FIG. 11 will be the values, represented by line 72, for points (i,j) to the left of point X and will be the values, represented by line 62, for points (i,j) to the right of point X.

Final values FBV and FPV are used during threshold determining step 58 shown in FIG. 6, when the final threshold values, FTV, are calculated as a proportional function (e.g. an average) of FBV and FPV. The final threshold values, FTV, are compared to the data line pixels $P_{i,j}$ in thresholding step 59 to produce a stream of binary pixels $B_{i,j}$ which together constitute a bitonal image of the original analog image on medium 21.

The flow diagram of FIG. 6 illustrates a computer software implementation for use with the data processor 26 (see FIG. 1), in which case data processor 26 may be a general purpose digital computer. Alternatively, data processor 26 may be implemented with a special purpose digital computer to perform the necessary image processing functions.

Figures 12, 12A:
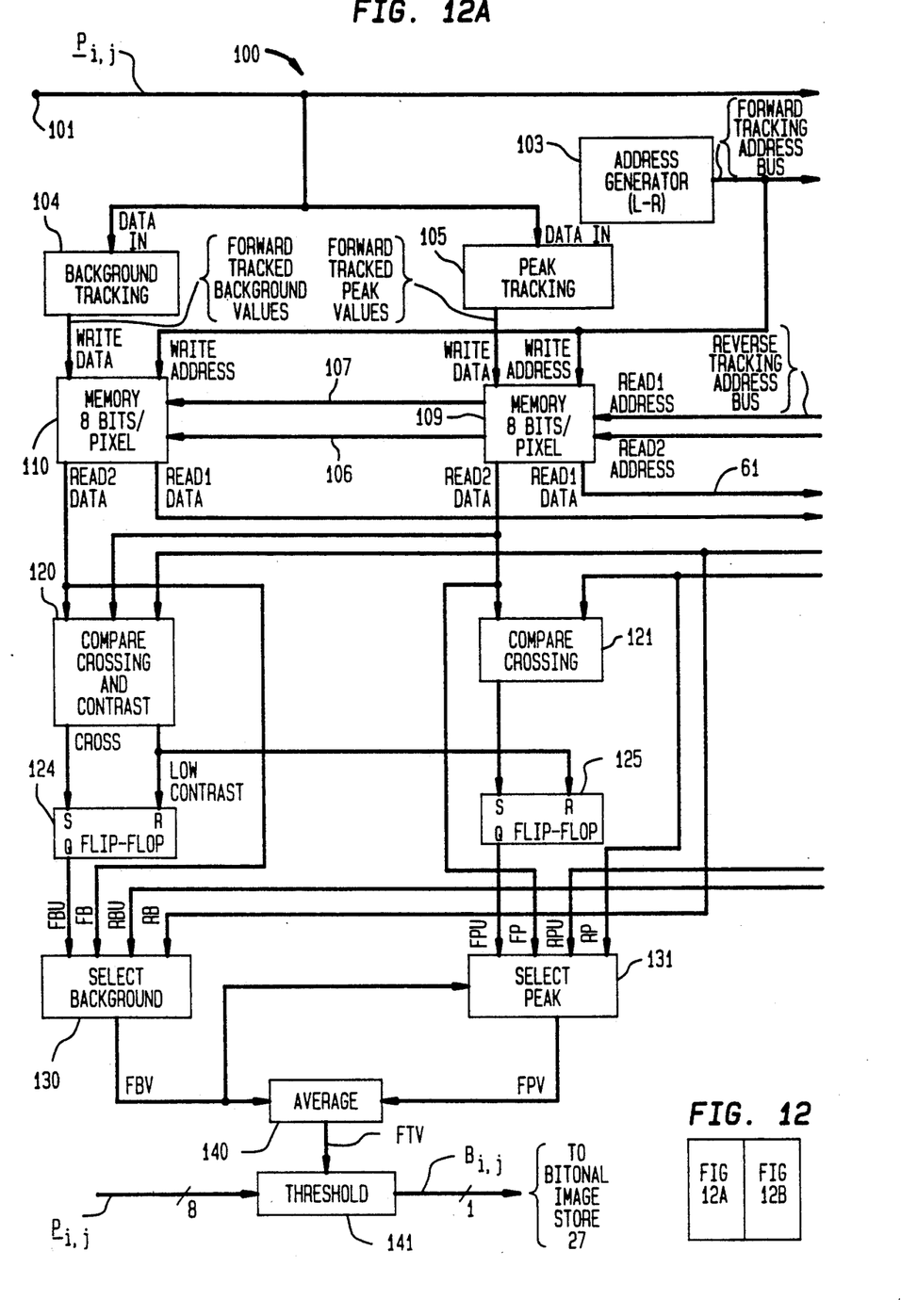
FIG. 12 shows the correct alignment of the drawing sheets for FIGS. 12A and 12B.
FIGS. 12A and 12B collectively show a schematic block diagram of an alternate embodiment of a portion of the system shown in FIG. 1.
Figure 12B:
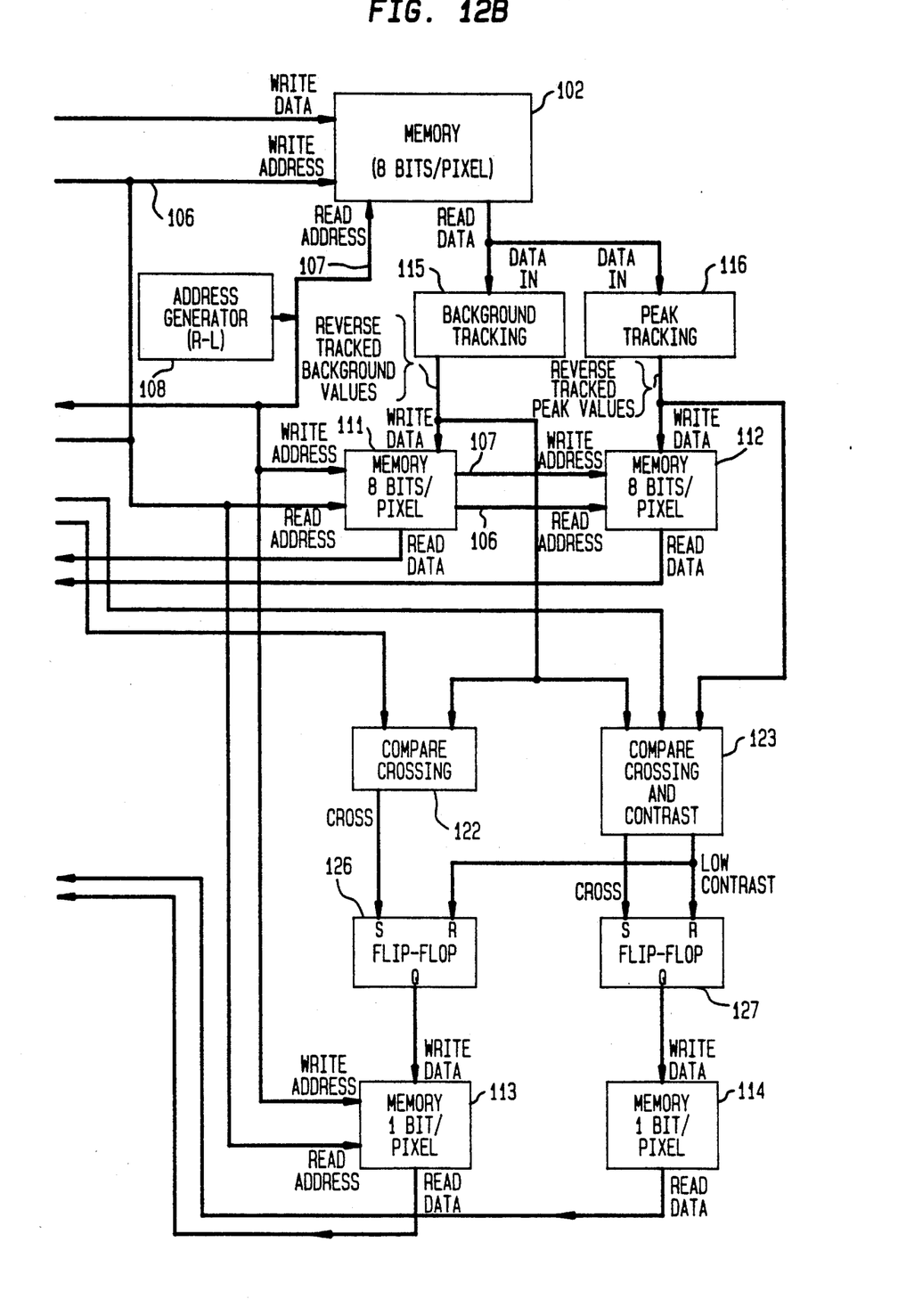

FIGS. 12A and 12B collectively depict a preferred special purpose digital system 100 to be incorporated in data processor 26 to perform pixel processing; the correct alignment of the drawing sheets for these figures is depicted in FIG. 12.

Specifically, as shown, digital system 100 includes data input terminal 101 for receiving grayscale image data, such as the data line pixels $P_{i,j}$. System 100 is clocked by data processor 26 in the same manner as are scanning circuit 23, A/D converter 24, and buffer 25. Data input terminal 101 is connected to a write data input of memory 102 and to the inputs of background tracking circuit 104 and peak tracking circuit 105.

System 100 also includes left-to-right (L-R) address generator 103 that is connected to forward tracking address bus 106, and right-to-left (R-L) address generator 108 that is connected to reverse tracking address bus 107. Bus 106 provides forward tracking addresses to write address inputs to memories 102, 109 and 110; read address inputs to memories 111, 112 and 113; and read #2 (shown as READ2) address inputs to memories 109 and 110. Bus 107 provides reverse tracking addresses to write address inputs to memories 111, 112 and 113; read address input to memory 102; and read #1 (shown as READ1) address inputs to memories 109 and 110.

The data inputs of background tracking circuit 115 and peak tracking circuit 116 are connected to read data output of memory 102. The data outputs of background tracking circuit 104 and peak tracking circuit 105 are connected to write data inputs of memories 110 and 109, respectively. Data outputs of background tracking circuit 115 and peak tracking circuit 116 are connected to write data inputs to memories 111 and 112, respectively.

Background and peak tracking circuits 104, 105, 115 and 116 are conventional logic devices that each compare two successive 8-bit pixels, e.g. $P_{i,j}$ and $P_{i,j+1}$, in the forward and reverse directions, and using rates r1 and r2, generate the appropriate tracked values, represented by lines 61, 62, 71 and 72 as shown in FIGS. 7 and 8. Consequently, forward background tracking circuit 104 supplies the forward tracked background values, represented by 62, forward peak tracking circuit 105 supplies the forward tracked peak values, represented by 61, reverse background tracking circuit 115 generates the reverse background values, represented by 72, and reverse peak tracking circuit 116 supplies the reverse tracked peak values, represented by 71.

System 100 also includes four comparator circuits 120, 121, 122 and 123, and four flip-flops 124, 125, 126 and 127. Circuit 120 has one data input connected to read #2 data output of memory 110, another data input connected to read #2 data output of memory 109, and a third data input connected to a read data output of memory 111. Circuit 120 has a cross output connected to a set (S) input of flip-flop 124 and a low contrast output connected to a reset (R) input of flip-flops 124 and 125. The output (Q) of flip-flop 124 is connected to forward background usable (FBU) input of select background logic 130. The read #2 data output of memory 110 is connected to forward background (FB) input of the logic 130.

Circuit 121 has one data input connected to read #2 data output of memory 109 and another data input connected to a read data output of memory 112. Circuit 121 has a cross output connected to a set (S) input of flip-flop 125. The output (Q) of flip-flop 125 is connected to the forward peak usable (FPU) input of select peak logic 131. The read #2 data output of memory 109 is connected to forward peak (FP) input of the logic 131.

Circuit 122 has one data input connected to read #1 data output of memory 110 and another data input connected to the data output of background tracking circuit 115. Circuit 122 has a cross output connected to a set (S) input of flip-flop 126. The output (Q) of flip-flop 126 is connected to a write data input of memory 113, which has a read data output connected to a reverse background usable (RBU) input of select background logic 130.

Circuit 123 has one data input connected to read #1 data output of memory 109, another data input connected to the data output of background tracking circuit 115, and a third input connected to the data output of peak tracking circuit 116. Circuit 123 has a cross output connected to a set (S) input of flip-flop 127 and a low-contrast output connected to a reset (R) input of flip-flops 127 and 126. The output of flip-flop 127 is connected to the write data input of memory 114 which has a read data output connected to the reverse peak usable (RPU) input of select peak logic 131.

The read data outputs of memories 111 and 112 are connected to the reverse background (RB) and the reverse peak (RP) inputs of select background circuit 130 and selected peak circuit 131, respectively. Both of these select circuits are implemented with combinatorial logic. The data output of select circuit 130 is connected to select circuit 131 and to one input of averaging circuit 140. The data output of select circuit 131 is connected to a second input of the averaging circuit 140. The output of averaging circuit 140 is the final threshold value FTV to be used for thresholding pixels $P_{i,j}$ in threshold circuit 141.

The operation of system 100 will now be described. Most of the left portion of system 100, as viewed in FIGS. 12A and 12B, processes the data in the forward (L-R) direction. The right portion of this system processes the data in the reverse (R-L) direction. System 100 operates in three passes for each line of pixels $P_{i,j}$. However, the third pass of a particular line could occur simultaneously with the first pass of the next line if memories 109 and 110 are constructed so that the previous value at a given pixel address (i,j) can be read while at essentially the same time a new value is being written.

Specifically, during the first pass, system 100 performs forward background and forward peak tracking. As such, pixels $P_{i,j}$ are written into memory 102 via data input terminal 101. The appropriate addresses of pixels $P_{i,j}$ are provided, via bus 106, to memory 102 by L-R address generator 103. Also during the first pass, the forward background values from background tracking circuit 104 and the forward peak values from forward peak tracking circuit 105, are written into memories 110 and 109, respectively, in accordance with their addresses provided, via bus 106, by L-R address generator 103.

During the second pass, system 100 performs the reverse background and reverse peak tracking, and validation functions. The second pass involves reading memories 102, 109 and 110, and writing into memories 111, 112, 113 and 114. These operations cause data, i.e. pixels $P_{i,j}$, to flow from the read data output of memory 102 in the reverse direction, i.e. from right to left, into reverse background and peak tracking circuits 115 and 116, which, in turn, write their output values into memories 111 and 112, respectively. The appropriate addresses used by reverse tracking circuits are provided, via bus 107, by R-L address generator 108.

Also during the second pass, memories 109 and 110 are read such that data flows from their corresponding read #1 data outputs to the inputs of crossing comparator circuit 122 and crossing and contrast comparator circuit 123. Circuit 123 uses, as input values, the reverse tracked peak and background values, to test for peak-to-background (P-B) contrast and uses as input values, the forward and reverse tracked peak values to test for peak crossing points. Circuit 122 uses as input values, the forward and reverse tracked background values, to test for background crossing points. The outputs of comparator circuits 122 and 123 validate the forward and reverse tracked values, based on contrast and crossing criteria.

During the third pass, system 100 performs forward background and peak validation, and final output. Memories 109-114 are read during the third pass in accordance with the forward tracking addresses provided, via bus 106, by L-R address generator 103.

Comparator circuits 120-123 include magnitude comparators that test whether a forward input is greater than or equal to a corresponding reverse input. For example, on the third pass, a forward tracked background value from memory 110 and its corresponding reverse tracked background value from memory 111 will both be applied as inputs to circuit 120. This comparator compares the magnitude of these inputs; the output state of the comparator is monitored. On any cycle in which the output of this comparator changes state, a crossing is considered to have occurred. As such, the cross output of the circuit 120 will set flip-flop 124.

Circuits 120 and 123 also test the current forward and reverse tracked peak and background values for sufficient contrast against the following previously stored value: (Q * max(P-B)). If the comparison fails, i.e. the local contrast (P-B) is less than the value Q * max(P-B), then the appropriate one of flip-flops 124-127 will be reset by the low-contrast output from the corresponding circuit 120 or 123. Specifically, the comparison of the forward (P-B) contrast resets two forward tracking flip-flops 124 and 125; which the comparison of the reverse peak-to-background (P-B) contrast resets two reverse tracking flip-flops 126 and 127.

If the above logic rules conflict for setting and resetting flip-flops 124-127, i.e. a particular flip-flop simultaneously meets both requirements of being set and reset, the reset operation takes precedence. If neither rule applies, the particular flip-flop will retain its current value.

Memories 113 and 114, respectively, store the output states of flip-flops 126 and 127 using one bit per pixel. These bits are read out of memories 113 and 114 on the third pass and supplied to the RBU and RPU inputs of select background logic circuit 130 and select peak logic circuit 131. The current state of the two usability inputs FBU and RBU to select background logic circuit 130 determines whether the FB value or the RB value will be used as the final background value, FBV. Likewise, the current state of the two usability inputs FPU and RPU to the select peak logic 131 determines whether the FP value or the RP value will be used as the final peak value, FPV. As indicated above with respect to FIG. 6, the select rules, which here are also employed in select circuits 130 and 131 shown in FIGS. 12A and 12B, are as follows:

- If both the forward and reverse background tracking values are usable, pick the maximum of these two values.
- If one or the other of these values is usable, pick that value.
- If neither is usable, pick the minimum of the two values (since one of these values could be in the initial settling phase and be much too high).
- If both the forward and reverse peak tracking values are usable, pick the minimum of these two values.
- If one or the other of these values is usable, pick that value.
- If neither of these values is usable, estimate a final peak value FPV as the final background value, FBV, +(Q * max(P-B)).

Consistent with these rules, select background logic circuit 130 may be implemented as shown in accordance with the following function shown in Table 1 below:

TABLE 1

| FUNCTION TABLE FOR CIRCUIT 130 | | |
|---|---|---|
| FBU | RBU | Function |
| 0 | 0 | min (FB, RB) |
| 1 | 0 | FB |
| 0 | 1 | RB |
| 1 | 1 | max (FB, RB) |

In addition, select peak logic circuit 131 may be implemented in accordance with the following function table shown in Table 2 below:

TABLE 2

| FUNCTION TABLE FOR CIRCUIT 131 | | |
|---|---|---|
| FPU | RPU | Function |
| 0 | 0 | FBV + (Q * max(P−B)) |
| 1 | 0 | FP |
| 0 | 1 | RP |
| 1 | 1 | min (FP, RP) |

The resulting FBV and FPV values are supplied to averaging circuit 140 which, in turn, outputs the final threshold value FTV. Thresholding circuit 141, using the FTV value, converts the 8-bit values for pixels $P_{i,j}$ into the corresponding binary pixels $B_{i,j}$ for storage in bitonal image store 27 (FIG. 1).

Although different embodiments of the present invention have been shown and described herein, many other varied embodiments that incorporate the teachings of the invention may be easily constructed by those skilled in the art.

INDUSTRIAL APPLICABILITY AND ADVANTAGES

The present invention is useful in imaging systems and particularly in systems for thresholding incoming pixel values. The invention advantageously provides adaptively changing usable threshold values that mitigate problems associated with "settling time" and other similar effects.

I claim:

1. An image processing system comprising:
   a pixel sensor means for sensing a plurality of pixels of a grayscale image and for generating grayscale image data;
   storage means connected to said sensor means for storing said grayscale image data:
   forward tracking means for reading sets of said image data from said storage means and wherein each said set is read in a forward sequence along a scan line and for providing forward tracked background and peak functions having values for each of a plurality of pixels along the scan line;
   reverse tracking means for reading said sets from said storage means in a reverse sequence and for providing reverse tracked background and peak functions having values for each of a plurality of pixels along the scan line;
   threshold level means connected to said forward and reverse tracking means for generating threshold levels for pixels along the scan line derived from either said forward or said reverse tracked functions; and a thresholding means for thresholding said grayscale image data, using said threshold levels, to provide binary image data.

2. The system of claim 1 wherein said forward tracking means provides said forward tracked background and peak functions as first and third functions of said image data, and said reverse tracking means provides said reverse tracked background and peak functions as second and fourth functions of said image data.

3. An image processing system comprising:
a pixel sensor means for sensing a plurality of pixels of a grayscale image and for generating grayscale image data;
storage means connected to said sensor means for storing said grayscale image data:
forward tracking means for reading sets of said image data from said storage means and wherein each said set is read in a forward sequence and for providing forward tracked background and peak functions as first and third functions of said set;
reverse tracking means for reading said sets from said storage means in a reverse sequence and for providing reverse tracked background and peak functions as second and fourth functions of said set;
threshold level means connected to said forward and reverse tracking means for generating a threshold level that is a proportional function of either said forward or said reverse tracked functions; and
a thresholding means for thresholding said grayscale image data, using said threshold level, to provide binary image data;
wherein said first function is such that said forward tracked background function will increase at a first rate if said grayscale image data is greater than said forward tracked background function and will decrease at a second rate if said grayscale image data is less than said forward tracked background function, and said forward tracked peak function will increase at said second rate if said grayscale image data is greater than said forward tracked peak function and will decrease at said first rate if said grayscale image data is less than said forward tracked peak function, and wherein the second rate is greater than the first rate.

4. The system of claim 3 wherein said second function is such that said reverse tracked background function will increase at the first rate if said grayscale image data is greater than said reverse tracked background function and will decrease at the second rate if said grayscale image data is less than said reverse tracked background function, and said reverse tracked peak function will increase at the second rate if said grayscale image data is greater than said reverse tracked peak function and will decrease at the first rate if said grayscale image data is less than said reverse tracked peak function.

5. The system of claim 4 wherein said first rate is linear and said second rate is exponential.

6. The system of claim 4 wherein said grayscale image includes digital data stored on film.

7. The system of claim 6 wherein said sets of grayscale image data correspond to data line pixels extending between different edges of said image.

8. The system of claim 7 wherein said digital data is stored in data cells arranged on said film in a two-dimensional array of rows and columns and wherein said data line pixels extend over the center portion of said data cells.

9. The system of claim 4 wherein said sets of grayscale image data correspond to lines of pixels extending between different edges of said image, and wherein said forward sequence starts at one of said edges and extends to the other of said edges and said reverse sequence starts at said other of said edges and extends to said one of said edges.

10. The system of claim 4 wherein said threshold level means includes comparator means for comparing said forward tracked function and said reverse tracked function against predetermined criteria and, depending on the results of the comparison, generating said threshold level as a function of either said forward or said reverse tracked functions.

11. The system of claim 10 wherein said proportional function is the average of said peak and background functions.

12. The system of claim 10 wherein said comparator means includes contrast means for determining validity of said forward and reverse tracked functions based on contrast criteria by comparing a difference between said forward tracked peak and background functions against a predetermined contrast standard, and by comparing a difference between said reverse tracked peak and background functions against said predetermined contrast standard.

13. The system of claim 12 wherein said comparator means includes crossing means for determining the validity based on whether said forward and reverse tracked peak functions have crossed and whether said forward and reverse tracked background functions have crossed.

14. The system of claim 13 wherein said threshold level means includes select means for selecting either said forward or said reverse tracked function for generating said threshold level based on the following rules:
if both of the forward and the reverse tracked background functions are valid, select the maximum of the forward and reverse tracked background functions, or if either of the forward or reverse tracked background functions is valid, select the valid forward or reverse tracked background function, or if neither is valid, select the minimum of the forward and reverse tracked background functions;
if both of the forward and reverse tracked peak functions are valid, select the minimum of the forward and reverse tracked peak functions, or if either one of the forward or reverse tracked peak functions is valid, select the valid forward or reverse tracked peak function, or if neither of the forward or reverse tracked peak functions is usable, select a value equaling a function of a selected background function and said contrast standard.

15. A method for processing an image comprising the steps of:
sensing a plurality of pixels of a grayscale image and generating corresponding grayscale image data;
storing said grayscale image data in a storage means;
forward tracking said grayscale image data by reading sets of said image data from said storage means in a forward sequence along a scan line, and providing forward tracked background and peak functions having values for each of a plurality of pixels along the scan line;
reverse tracking said grayscale image data by reading said sets from said storage means in a reverse sequence, and providing background and peak tracked functions having values for each of a plurality of pixels along the scan line;

generating threshold levels for pixels along the scan line derived from either said forward or said reverse tracked functions; and thresholding said grayscale image data using said threshold levels to provide binary image data.

16. The method of claim 15 wherein said forward tracking provides said forward tracked background and peak functions as first and third functions of said image data, and said reverse tracking provides said reverse tracked background and peak functions as second and fourth functions of said image data.

17. A method for processing an image comprising the steps of:

sensing a plurality of pixels of a grayscale image and generating corresponding grayscale image data;

storing said grayscale image data in a storage means;

forward tracking said grayscale image data by reading sets of said image data from said storage means in a forward sequence, and providing forward tracked background and peak functions as first and third functions of said set;

reverse tracking said grayscale image data by reading said sets from said storage means in a reverse sequence, and providing reverse background and peak tracked functions as second and fourth functions of said set;

generating a threshold level that is a proportional function of either said forward or said reverse tracked functions; and thresholding said grayscale image data using said threshold levels to provide binary image data;

wherein said first function is such that said forward tracked background function will increase at a first rate if said grayscale image data is greater than said forward tracked background function, and will decrease at a second rate if said grayscale image data is less than said forward tracked background function, and said forward tracked peak function will increase at said second rate if said grayscale image data is greater than said forward tracked peak function, and will decrease at said first rate if said grayscale image data is less than said forward tracked peak function, and wherein said second rate is greater than said first rate.

18. The method of claim 17 wherein said second function is such that said reverse tracked background function will increase at said first rate if said grayscale image data is greater than said reverse tracked background function, and will decrease at said second rate if said grayscale image data is less than said reverse tracked background function, and said reverse tracked peak function will increase at said second rate if said grayscale image data is greater than said reverse tracked peak function, and will decrease at said first rate if said grayscale image data is less than said reverse tracked peak function.

19. The method of claim 18 wherein said first rate is linear and said second rate is exponential.

20. The method of claim 18 wherein said grayscale image includes digital data stored on film.

21. The method of claim 20 wherein said sets of grayscale image data correspond to data line pixels extending between different edges of said image.

22. The method of claim 21 wherein said digital data is stored in data cells arranged on said film in a two-dimensional array of rows and columns and wherein said data line pixels extend over the center portion of said data cells.

23. The method of claim 18 wherein said sets of grayscale image data correspond to lines of pixels extending between different edges of said image, and wherein said forward sequence involves reading said data sequentially by starting at one of said edges and ending at the other of said edges and said reverse sequence involves reading said data sequentially by starting at said other of said edges and ending at said one of said edges.

24. The method of claim 18 wherein said generating threshold level step includes comparing said forward tracked function and said reverse tracked function against predetermined criteria and, depending on the results of the comparison, generating said threshold level as a function of either said forward or said reverse tracked functions.

25. The method of claim 24 wherein said proportional function is the average of said peak and background functions.

26. The method of claim 24 wherein said comparing step includes determining validity of said forward and reverse tracked functions based on contrast criteria by comparing a difference between said forward tracked peak and background functions against a predetermined contrast standard, and by comparing the difference between said reverse tracked peak and background functions against said predetermined contrast standard.

27. The method of claim 26 wherein said comparing step includes determining the validity of said forward and reverse tracked functions based on whether said forward and reverse tracked peak functions have crossed and whether said tracked background functions have crossed.

28. The method of claim 27 wherein said threshold level generating step comprises the step of selecting either said forward or said reverse tracked function for generating said threshold level based on the following rules:

if both of said forward and said reverse tracked background functions are valid, select the maximum of the forward and reverse tracked background functions, or if either of the forward or reverse tracked background functions is valid, select the valid forward or reverse tracked background function, or if neither is valid, select the minimum of the forward and reverse tracked background functions;

if both of the forward and said reverse tracked peak functions are valid, select the minimum of the forward and reverse tracked peak functions, or if either of the forward and reverse tracked peak functions is valid, select the valid forward or reverse tracked peak function, or if neither of the forward or reverse tracked peak functions is usable, select a value equaling a function of a selected background function and said contrast standard.

* * * * *